(12) United States Patent
Hsieh et al.

(10) Patent No.: US 10,141,847 B2
(45) Date of Patent: Nov. 27, 2018

(54) SWITCHED CAPACITOR DC-DC CONVERTOR CIRCUIT AND PRODUCTION METHOD THEREOF

(71) Applicant: NUVOTON TECHNOLOGY CORPORATION, Hsinchu (TW)

(72) Inventors: Chung-Ming Hsieh, Hsinchu Science Park (TW); Wei-Chan Hsu, Cupertino, CA (US)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 15/697,924

(22) Filed: Sep. 7, 2017

(65) Prior Publication Data

US 2018/0212521 A1    Jul. 26, 2018

(30) Foreign Application Priority Data

Jan. 26, 2017    (TW) .............................. 106103184 A (51) Int. Cl.
| | | |
|---|---|---|
| H02M 3/07 | (2006.01) | |
| H02M 3/158 | (2006.01) | |
| H02M 1/32 | (2007.01) | |

(52) U.S. Cl.
CPC .............. *H02M 3/158* (2013.01); *H02M 1/32* (2013.01); *H02M 3/07* (2013.01)

(58) Field of Classification Search
CPC .......... H02M 3/07; H02M 3/18; H02M 3/073; H02M 2003/075; H02M 2003/076; H02M 2003/077; H02M 2007/4835; H02M 7/10; H02M 7/106; H02M 3/06; H03K 3/537; G11C 5/145

See application file for complete search history.

(56) References Cited

U.S. PATENT DOCUMENTS

| | | | | |
|---|---|---|---|---|
| 5,262,934 A  * | 11/1993 | Price ........................ | H02M 3/07 |
| | | | 363/60 |
| 5,461,557 A  * | 10/1995 | Tamagawa ............... | H02M 3/07 |
| | | | 307/110 |
| 5,532,916 A  * | 7/1996 | Tamagawa ............... | H02M 3/07 |
| | | | 307/110 |
| 7,907,429 B2 * | 3/2011 | Ramadass ................ | H02M 3/07 |
| | | | 307/110 |
| 2008/0007981 A1* | 1/2008 | Erbito ...................... | H02M 3/07 |
| | | | 363/60 |

* cited by examiner

*Primary Examiner* — Gary L Laxton
(74) *Attorney, Agent, or Firm* — Muncy, Geissler, Olds & Lowe P.C.

(57) ABSTRACT

A switched capacitor DC-DC convertor circuit and a production method thereof are described. The switched capacitor DC-DC convertor circuit includes two switched-capacitor circuits each including at least one capacitor, multiple internal switches and the same circuit layout. The internal switches of the two switched-capacitor circuits corresponding in position to each other are controlled by different control signals, and the turn-on durations of the control signals do not overlap. The capacitors of the two switched capacitor circuits are connected by an interconnection switch, and a turn-on duration of a control signal for the interconnection switch also does not overlap with that of the control signals for the internal switches. The switched capacitor DC-DC convertor circuit has a lower switching power loss compared to current state of the art.

8 Claims, 6 Drawing Sheets

SWITCHED CAPACITOR DC-DC CONVERTOR CIRCUIT AND PRODUCTION METHOD THEREOF

CROSS-REFERENCE TO RELATED APPLICATION

This application claims priority from Taiwan Patent Application No. 106103184 filed on Jan. 26, 2017 at the Taiwan Intellectual Property Office, the content of which is hereby incorporated by reference in its entirety for all purposes.

BACKGROUND OF THE INVENTION

1. Field of the Invention

The present invention is related to a switched capacitor DC-DC convertor circuit and a production method thereof, and more particularly to a switched capacitor DC-DC convertor circuit capable of reducing switching power loss as well as a production method thereof.

2. Description of the Related Art

The switched capacitor DC-DC power converter (SCPC) circuit has the advantage of a high transforming efficiency without utilizing external inductive components, and so is suitable for integration in chips. Consequently, SCPC circuits have generally been used inside the MCU as the voltage transforming circuit.

The switched capacitor DC-DC power converter (SCPC) circuit includes at least one capacitor and a plurality of switches. During the operation process thereof, the switches are frequently changed between the turn-on state and the turn-off state, and voltages at the two terminals of the capacitor frequently change as well. Due to the manufacturing process of the circuit and the structure of the capacitor, a parasitic capacitor is formed between the aforementioned structure of the capacitor and other structures inside the chip (e.g. a silicon substrate). Hence, when voltages at the two terminals of the capacitor frequently change, the parasitic capacitor is also charged and discharged frequently, and this is the source of an unnecessary power loss.

SUMMARY OF THE INVENTION

In order to solve the problem described above, the present invention provides a switched capacitor DC-DC convertor circuit and a production method thereof, so as to reduce the unnecessary power loss.

In accordance with one embodiment of the present invention, the switched capacitor DC-DC convertor circuit includes a first switched capacitor circuit, a second switched capacitor circuit and a fifth switch. The first switched capacitor circuit includes a first input terminal, a first output terminal, a plurality of first switches, a plurality of second switches and at least one first capacitor. The first switches and the second switches are connected with the at least one first capacitor respectively, wherein the first switches are controlled by a first control signal, and the second switches are controlled by a second control signal. A second switched capacitor circuit includes a second input terminal, a second output terminal, a plurality of third switches, a plurality of fourth switches and at least one second capacitor. The third switches and the fourth switches are connected with the at least one second capacitor respectively, wherein the third switches are controlled by the second control signal, and the fourth switches are controlled by the first control signal. At least one fifth switch is electrically connected with the at least one first capacitor and the at least one second capacitor, and controlled by a third control signal. Wherein the first input terminal and the second input terminal are electrically connected with and receive an input voltage, the first output terminal and the second output terminal are electrically connected with and output an output voltage, the at least one first capacitor and the at least one second capacitor have the same capacitance value, the first switched capacitor circuit and the second switched capacitor circuit have the same component connecting structure, the first switches correspond to the third switches, and the second switches correspond to the fourth switches. Furthermore, turn-on durations of the first control signal, the second control signal and the third control signal do not overlap with one another.

Preferably, during the turn-on duration of the third control signal, the at least one fifth switch is turned on, the first switches and the fourth switches are turned off via the first control signal, and the second switches and the third switches are turned off via the second control signal.

Preferably, numbers of the at least one fifth switch, at least one first capacitor and at least one second capacitor are all plural, such that for each of the first capacitors and each of the second capacitors, one of the fifth switches is electrically connected between one of the first capacitors and a corresponding one of the second capacitors.

Preferably, the at least one fifth switch is electrically connected with terminals of the at least one first capacitor and the at least one second capacitor having the same polarity.

In accordance with one embodiment of the present invention, a method of producing the switched capacitor DC-DC convertor circuit includes steps as follows: providing an original switched capacitor circuit, which includes an input terminal, an output terminal, a plurality of first switches, a plurality of second switches and at least one capacitor, wherein the first switches and the second switches are connected with the at least one capacitor respectively, the first switches are controlled by a first control signal, and the second switches are controlled by a second control signal; determining a first switched capacitor circuit and a second switched capacitor circuit according to the original switched capacitor circuit, wherein component connecting structures of the first switched capacitor circuit and the second switched capacitor circuit are the same as that of the original switched capacitor circuit, capacitance values of at least one capacitor of the first switched capacitor circuit and the second switched capacitor circuit are half as large as that of the original switched capacitor circuit, the first switches of the first switched capacitor circuit are controlled by the first control signal, the second switches of the first switched capacitor circuit are controlled by the second control signal, the first switches of the second switched capacitor circuit are controlled by the second control signal, and the second switches of the second switched capacitor circuit are controlled by the first control signal; electrically connecting at least one third switch with the at least one capacitor of the first switched capacitor circuit and the at least one capacitor of the second switched capacitor circuit, wherein the at least one third switch is controlled by a third control signal, and turn-on durations of the first control signal, the second control signal and the third control signal do not overlap with one another; electrically connecting the input terminal of the first switched capacitor circuit with that of the second switched capacitor circuit; and electrically connecting the output terminal of the first switched capacitor circuit with that of the second switched capacitor circuit.

Preferably, numbers of the at least one third switch, the at least one first capacitor and the at least one second capacitor are all plural, such that for each of the first capacitors and each of the second capacitors, one of the third switches is electrically connected between one of the first capacitors and a corresponding one of the second capacitors.

Preferably, the at least one third switch is electrically connected with terminals of the at least one first capacitor and the at least one second capacitor having the same polarity.

BRIEF DESCRIPTION OF THE DRAWINGS

The aforementioned and other technical characteristics as well as advantages of the present invention will be more easily ascertained by referring to the exemplified aspects of the present invention and the appended drawings, wherein.

DESCRIPTION OF THE PREFERRED EMBODIMENTS

Hereinafter, the term "and/or" includes any or every combination of one or more relative listed items. On the other hand, when the term "at least one" is added before a listed component, the term "at least one" means to additionally describe every listed component rather than the listed component only.

Figure 1:
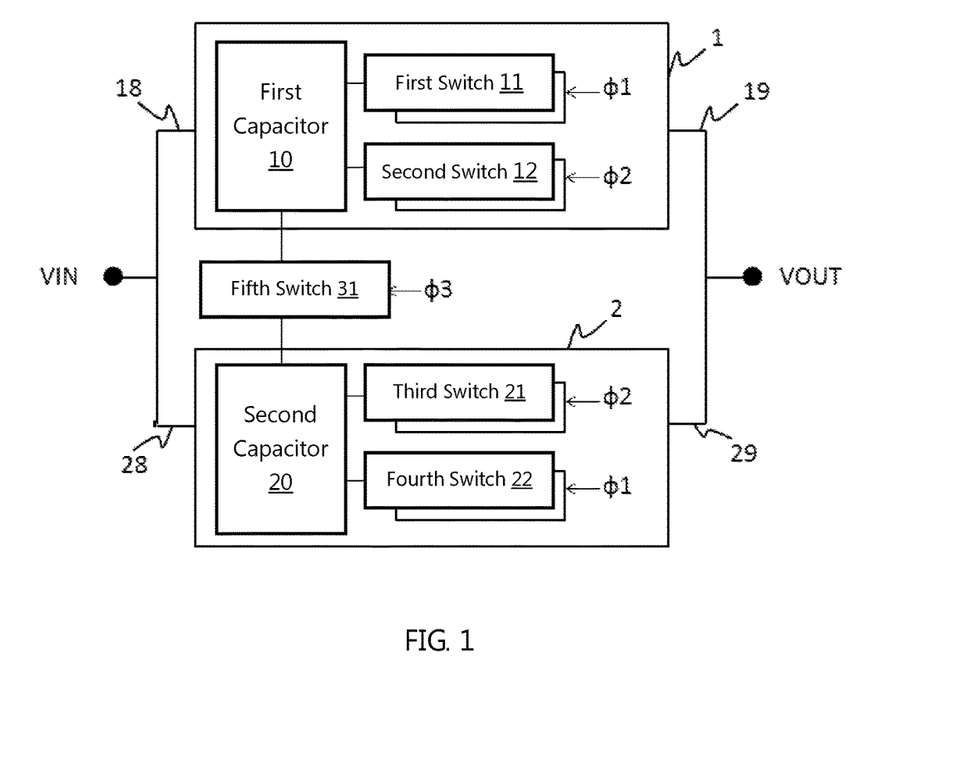
FIG. 1 is a schematic diagram of the switched capacitor DC-DC convertor circuit of the present invention.

Please refer to FIG. 1, which depicts the schematic diagram of the switched capacitor DC-DC convertor circuit of the present invention. As illustrated in FIG. 1, the switched capacitor DC-DC convertor circuit comprises a first switched capacitor circuit 1, a second switched capacitor circuit 2 and at least one fifth switch 31. The number of capacitors in the first switched capacitor circuit 1 is the same as that in the second switched capacitor circuit 2, and the number of fifth switches 31 is the same as the number of capacitors included in the first switched capacitor circuit 1 or the second switched capacitor circuit 2.

The first switched capacitor circuit 1 includes a first input terminal 18, a first output terminal 19, a plurality of first switches 11, a plurality of second switches 12 and a first capacitor 10. The first switches 11 and the second switches 12 are connected with the first capacitor 10 separately. Each of the first switches 11 is controlled by a first control signal $\phi 1$ to be in a closed state or in an open state, and each of the second switches 12 is controlled by a second control signal $\phi 2$ to be in a closed state or in an open state.

The second switched capacitor circuit 2 includes a second input terminal 28, a second output terminal 29, a plurality of third switches 21, a plurality of fourth switches 22 and a second capacitor 20. The third switches 21 and the fourth switches 22 are connected with the second capacitor 20 separately. Each of the third switches 21 is controlled by the second control signal $\phi 2$ to be in the closed state or in the open state, and each of the fourth switches 22 is controlled by a first control signal $\phi 1$ to be in the closed state or in the open state.

The fifth switch 31 is electrically connected with the first capacitor 10 and the second capacitor 20, and controlled by a third control signal $\phi 3$. If numbers of the fifth switch 31, the first capacitor 10 and the second capacitor 20 are all plural, then for each of the first capacitors 10 and each of the second capacitors 20, a fifth switch 31 is electrically connected between one of the first capacitors 10 and a corresponding one of the second capacitors 20, i.e. the relationship of the first capacitor 10, the fifth switch 31 and the second capacitor 20 is one-to-one-to-one. The specific circuit layout thereof will be more explicitly described in the exemplified aspect of the present invention as follows. Furthermore, the fifth switch 31 may be electrically connected with terminals of the first capacitor 10 and the second capacitor 20 having the same polarity. For example, the fifth switch 31 is connected with the bottom pole plates of the first capacitor 10 and the second capacitor 20.

Figure 2:
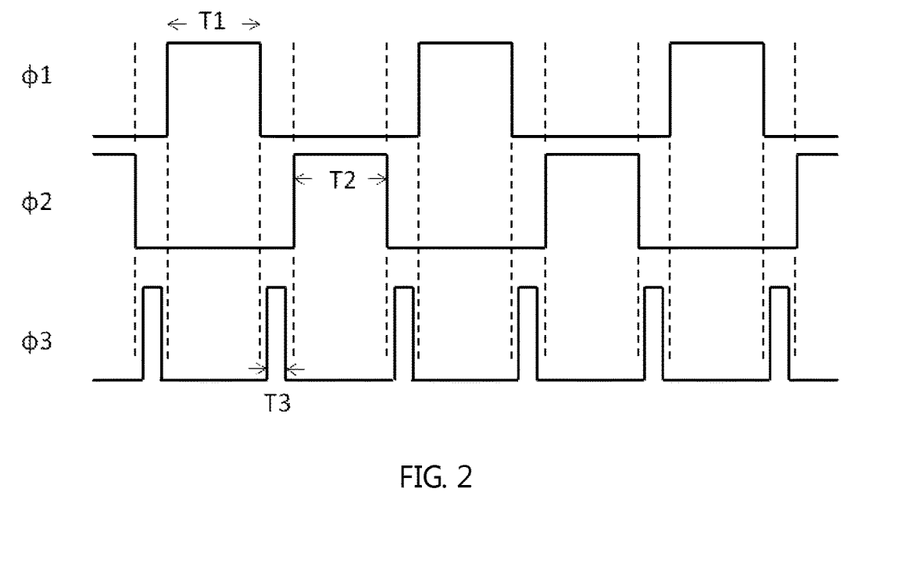
FIG. 2 is an oscillogram of the control signals of the switched capacitor DC-DC convertor circuit of the present invention.

Please refer to FIG. 2, which depicts the oscillogram of the first control signal $\phi 1$, second control signal $\phi 2$ and third control signal $\phi 3$ of the switched capacitor DC-DC convertor circuit of the present invention. As illustrated in FIG. 2, all these three control signals have high-potential durations and low-potential durations. In the high-potential durations, switches controlled by these control signals are in the closed state, such that the high-potential durations are also the turn-on durations. By contrast, in the low-potential durations, switches controlled by these control signals are changed to be in the open state, such that the low-potential durations are also the turn-off durations.

What should be noticed is that the turn-on duration T1 of the first control signal $\phi 1$, the turn-on duration T2 of second control signal $\phi 2$ and the turn-on duration T3 of third control signal $\phi 3$ do not overlap with one another. In other words, in the switched capacitor DC-DC convertor circuit, both the first switches 11 and the fourth switches 22 are controlled by the first control signal $\phi 1$, such that the first switches 11 and the fourth switches 22 are simultaneously in the closed state or in the open state; and both the second switches 12 and the third switches 21 are controlled by the second control signal $\phi 2$, such that the second switches 12 and the third switches 21 are simultaneously in the closed state or in the open state. Moreover, the three groups of switches, i.e. the first switches 11 and fourth switches 22, the second switches 12 and third switches 21, and the fifth switches 31, would not be in the closed state simultaneously.

Consequently, in the turn-on duration T3 of the third control signal $\phi 3$, the fifth switches 31 are in the closed state, the first switches 11 and the fourth switches 22 are in the open state via the first control signal $\phi 1$, and the second switches 12 and the third switches 21 are in the open state via the second control signal $\phi 2$.

What should also be noticed is that capacitance values of the first capacitor 10 and the second capacitor 20 are the same, component connecting structures of the first switched capacitor circuit 1 and the second switched capacitor circuit 2 are the same, the first switches 11 correspond in a one-to-one manner to the third switches 21, and the second switches 12 correspond in a one-to-one manner to the fourth switches 22.

The first input terminal 18 is electrically connected with the second input terminal 28, and the first output terminal 19 is electrically connected with the second output terminal 29. In the operation process of the first switched capacitor circuit 1, due to the periodicities of the turn-on durations and the turn-off durations of the first switches 11 and the second switches 12 which do not overlap each other, the first capacitor 10 may continuously receive the energy of input voltage VIN from the first input terminal 18, subsequently transform the input voltage VIN into the output voltage VOUT, and eventually transmit the output voltage VOUT to the first output terminal 19. The operation manner of the second switched capacitor circuit 2 is the same as that of the first switched capacitor circuit 1 described above, and thus not described here again.

In the operation process of the first switched capacitor circuit 1 and the second switched capacitor circuit 2, voltages at two terminals of both the first capacitor 10 and the second capacitor 20 continuously change, such that parasitic capacitors generated due to the structures of the first capacitor 10 and the second capacitor 20 continuously store electric charge (when the voltages at two terminals of the parasitic capacitors increase) and release electric charge (when the voltages at two terminals of the parasitic capacitors decrease). Hence, the phenomenon described above leads to the unnecessary power loss. As a result, in the condition that the first switches 11, the second switches 12, the third switches 21 and the fourth switches 22 are all in the turn-off durations, the fifth switches 31 are in the turn-on durations. Here, the voltages at the two terminals of the parasitic capacitors of the first capacitor 10 and the second capacitor 20 are accordingly balanced, such that the power loss is reduced.

An exemplified circuit layout will be used to explicitly describe the switched capacitor DC-DC convertor circuit of the present invention as follows.

Figure 3:
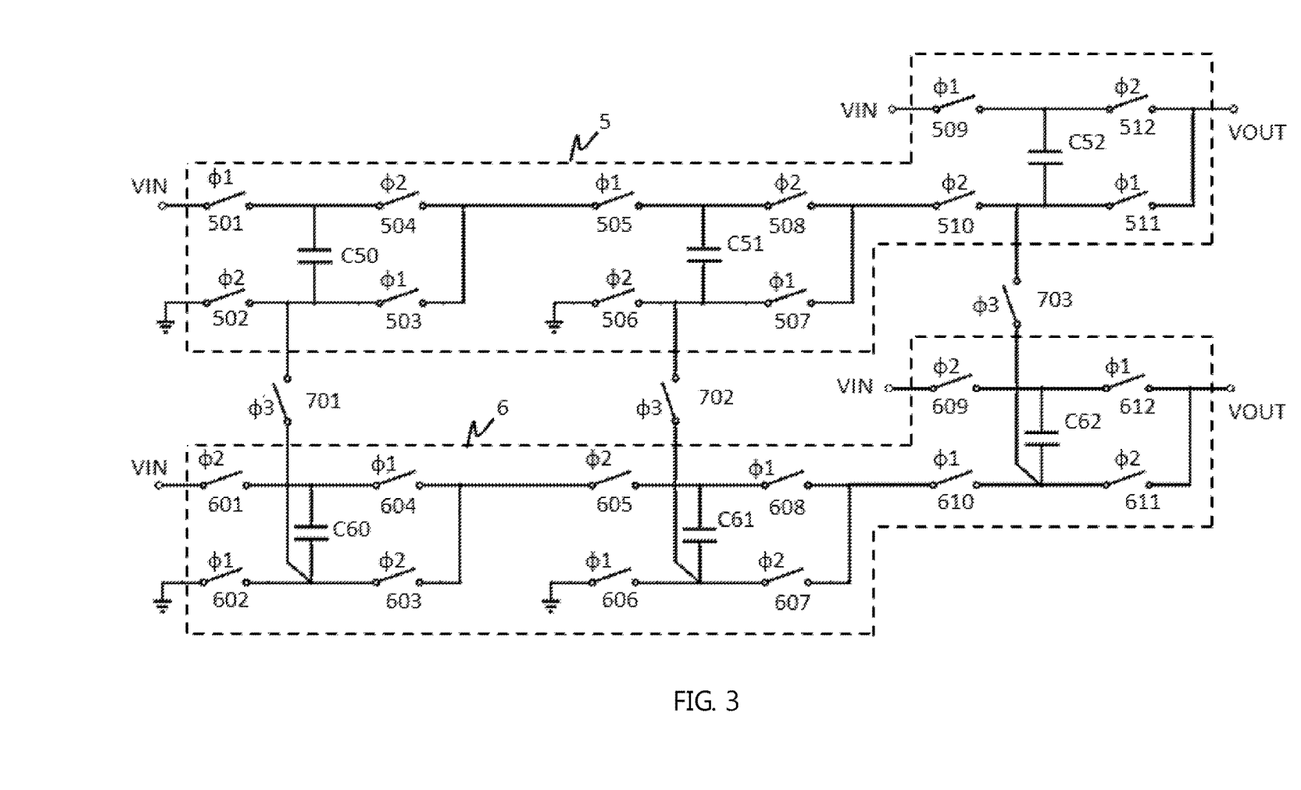
FIG. 3 is a circuit layout diagram of one embodiment of the switched capacitor DC-DC convertor circuit of the present invention.

Please refer to FIG. 3, which depicts the circuit layout diagram of one embodiment of the switched capacitor DC-DC convertor circuit of the present invention. As illustrated in FIG. 3, the switched capacitor DC-DC convertor circuit comprises a first switched capacitor circuit 5, a second switched capacitor circuit 6 and three fifth switches 701, 702, 703, wherein both the first switched capacitor circuit 5 and the second switched capacitor circuit 6 have three capacitors, six switches controlled by the first control signal φ1 and six switches controlled by the second control signal φ2, and the component connecting structures of the first switched capacitor circuit 5 and the second switched capacitor circuit 6 are the same. Besides, the input terminals of the first switched capacitor circuit 5 and the second switched capacitor circuit 6 are electrically connected and receive the input voltage VIN; whereas, the output terminals of the first switched capacitor circuit 5 and the second switched capacitor circuit 6 are electrically connected and output the output voltage VOUT. Furthermore, the fifth switches 701, 702 and 703 are connected between the capacitors C50 and C60, the capacitors C51 and C61, the capacitors C52 and C62, respectively.

The voltage changes at bottom terminals of capacitors C50 and C60 in the condition that the control signals φ1 and φ2 are in different phases will be more specifically described as follows. Please refer to FIG. 2, in the duration T1, the control signal φ1 is in the high-potential duration and the control signal φ2 is in the low-potential duration, such that the switches 501, 503, 505, 507, 509, 511 are in the closed state, the switches 502, 504, 506, 508, 510, 512 are in the open state, and the voltage value of the bottom terminal of the capacitor C50 is denoted as VIN/2; and in the meantime, the switches 602, 604, 606, 608, 610, 612 are in the closed state, the switches 601, 603, 605, 607, 609, 611 are in the open state, and the bottom terminal of the capacitor C60 is connected to ground (i.e. the voltage value thereof is 0). Similarly, in the duration T2, the control signal φ1 is in the low-potential duration and the control signal φ2 is in the high-potential duration, such that the voltage value at the bottom terminal of the capacitor C50 is 0, and the voltage value at the bottom terminal of the capacitor C60 is denoted as VIN/2.

On the basis of content described above, it is obvious that, if the parasitic capacitors CBP1 and CBP2 are generated between the bottom terminal structure of the capacitor C50 and other structures (such as a silicon substrate) and between the bottom terminal structure of the capacitor C60 and other structures (such as a silicon substrate) respectively, the parasitic capacitor CBP1 will store energy $E1=\frac{1}{2}*C*(VIN/2)^2$ in the duration T1, wherein C is the capacitance value of CBP1, i.e. a stored energy of a capacitor is proportional to a square of a voltage value between two terminals thereof, such that the higher the voltage value between the two terminals is, the higher the stored energy is; whereas, in the duration T2, the bottom terminal of the capacitor C50 is connected to ground and the voltage value thereof is accordingly 0, i.e. the voltage value between two terminals of the parasitic capacitor CBP1 is also 0, and the energy stored in the duration T1 is completely released in the duration T2. Equivalently, the same conditions occur with respect to the parasitic capacitor CBP2. Consequently, the switching power loss is generated in the switched capacitor DC-DC convertor circuit.

Hence, in the switched capacitor DC-DC convertor circuit of present invention, the bottom terminal of the capacitor C50 is electrically connected with that of the capacitor C60 in the duration T3 which does not overlap the durations T1 and T2, such that the voltages thereof are balanced. Take FIG. 2 for example, in the duration T1, the voltage value of the bottom terminal of the capacitor C50 is denoted as VIN/2, and the voltage value of the bottom terminal of the capacitor C60 is 0, such that the voltage values thereof both become VIN/4 in the duration T3. That is, in the duration T2, the voltage value of the bottom terminal of the capacitor C50 becomes 0, and the power loss thereof is only one quarter as large as the original power loss. Moreover, in the duration T2, the voltage value of the bottom terminal of the capacitor C60 is charged from VIN/4 to VIN/2, such that the charged energy is also less than the original one. Similarly, in the duration T3 following the duration T2, the bottom terminal of the capacitor C50 is electrically connected with that of the capacitor C60 again, so as to make the voltages thereof balanced, such that, in the following duration T1, the power loss of the capacitor C60 and the charged energy of the capacitor C50 may also both be reduced.

Through the explicit description above, it can be understood how the mechanism of electrical connection between the bottom terminals of the capacitors C50 and C60 can reduce the switching power loss in the switched capacitor DC-DC convertor circuit of present invention. Besides, the same operation theory may be applied to the capacitors C51, C61 and the capacitors C52, C62, and thus the description thereof is not repeated herein.

Figure 4:
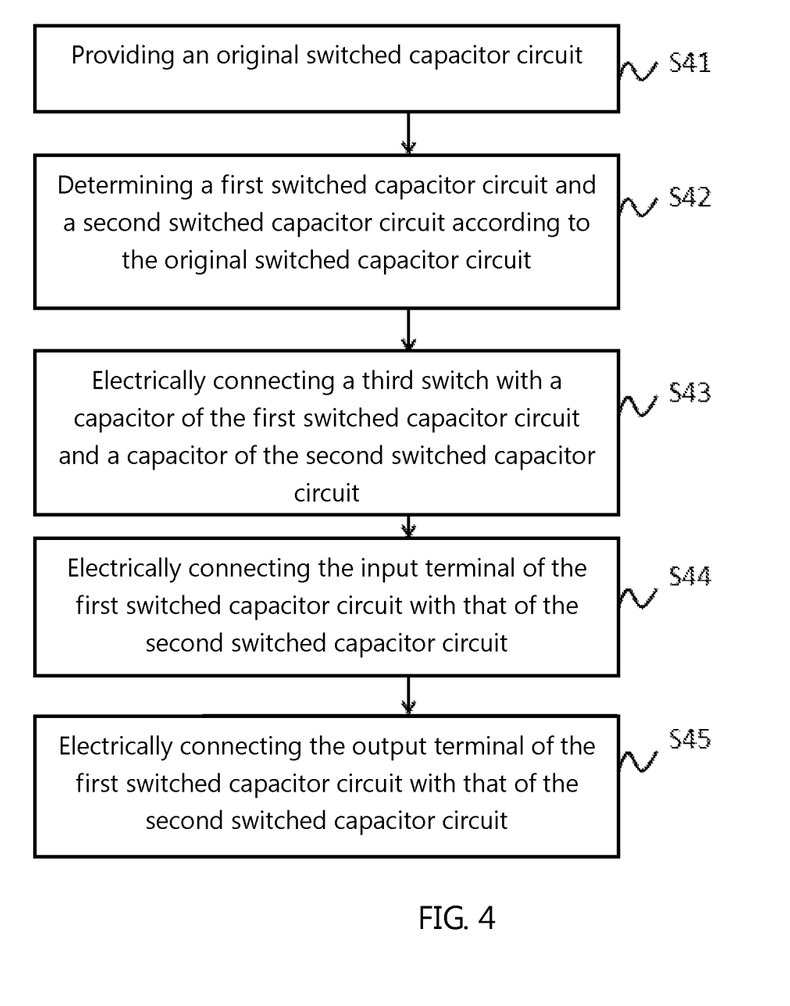
FIG. 4 is a flow chart of the method of producing the switched capacitor DC-DC convertor circuit of the present invention.
Figure 5:
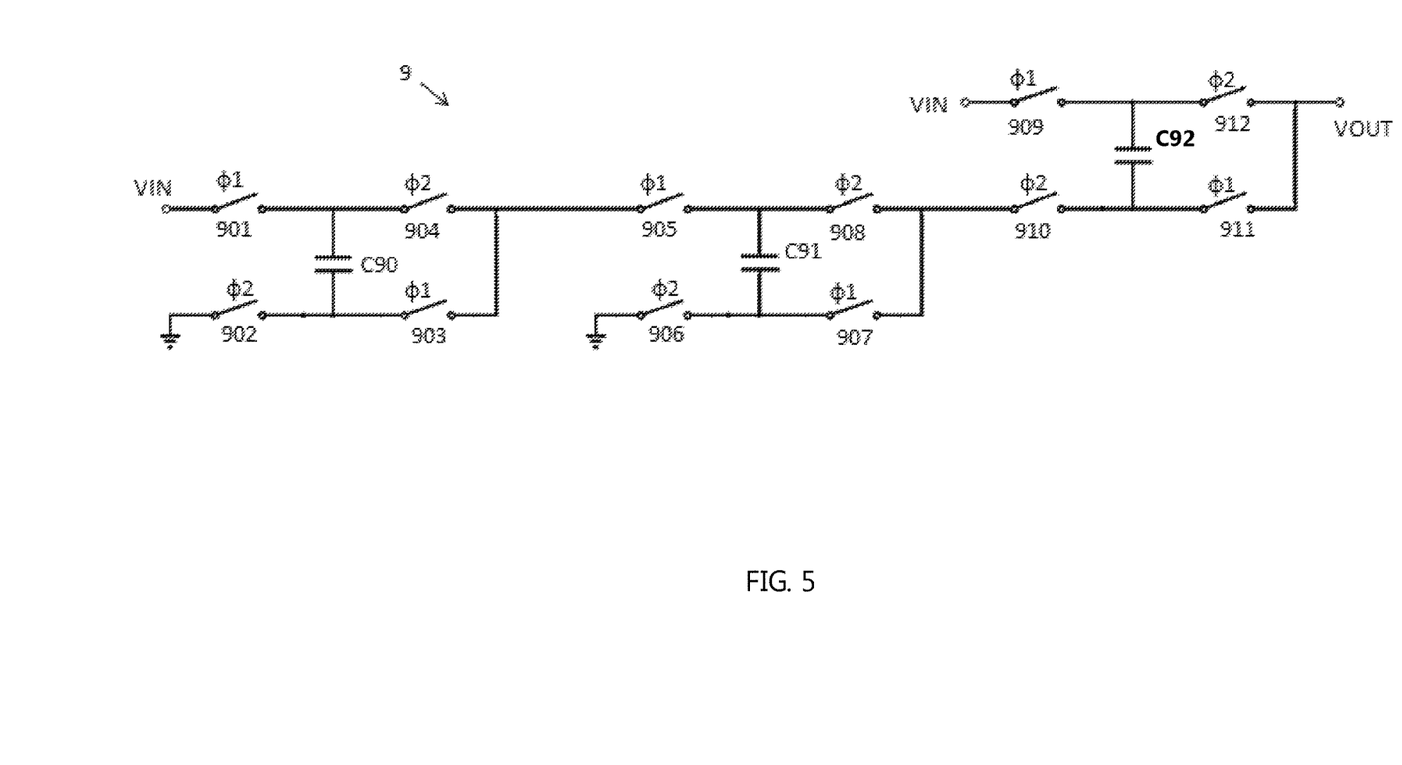
FIG. 5 is a circuit layout diagram of one step in the method of producing the switched capacitor DC-DC convertor circuit of the present invention.
Figure 6:
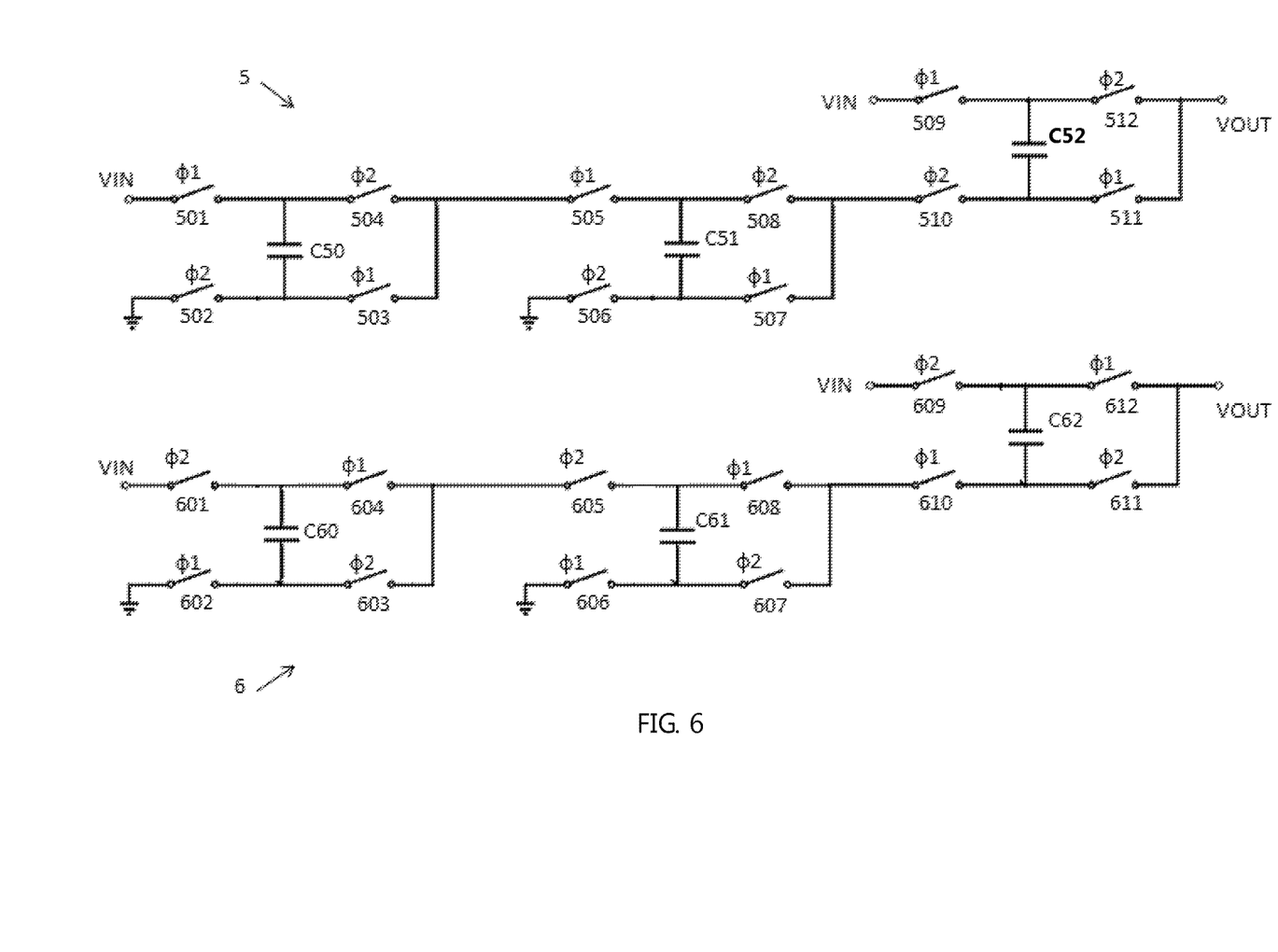
FIG. 6 is a circuit layout diagram of another step in the method of producing the switched capacitor DC-DC convertor circuit of the present invention.

Please refer to FIG. 4 to FIG. 6, wherein FIG. 4 depicts a flow chart of the method of producing the switched capacitor DC-DC convertor circuit of the present invention, FIG. 5 is the circuit layout diagram of one step in the method of producing the switched capacitor DC-DC convertor circuit of the present invention, and FIG. 6 is the circuit layout diagram of another step in the method of producing the switched capacitor DC-DC convertor circuit of the present invention. As illustrated in FIG. 4, the method of producing the switched capacitor DC-DC convertor circuit of the present invention comprises steps as follows.

In the step S41, an original switched capacitor circuit (such as the original switched capacitor circuit 9 as illustrated in FIG. 5) is provided, which includes an input terminal, an output terminal, a plurality of first switches, a plurality of second switches and at least one capacitor, wherein the first switches and the second switches are connected with at least one capacitor respectively, the first switches are controlled by a first control signal, and the second switches are controlled by a second control signal. As illustrated in FIG. 5, the switched capacitor circuit 9 includes an input terminal receiving an input voltage VIN, an output terminal outputting an output voltage VOUT, three capacitors C90-C92, six first switches 901, 903, 905, 907, 909, 911 controlled by a first control signal $\phi 1$, and six second switches 902, 904, 906, 908, 910, 912 controlled by a second control signal $\phi 2$. Furthermore, two terminals of each capacitor are electrically connected with two first switches and two second switches separately.

As illustrated in FIG. 5, the output voltage and the input voltage of the switched capacitor circuit 9 have the following relationship:

$$VOUT=VIN*[(½)^2+1]/2=⅝*VIN$$

Hence, the conversion ratio of the input voltage to the output voltage is 0.625.

In the step S42, a first switched capacitor circuit and a second switched capacitor circuit are determined according to the original switched capacitor circuit, wherein the component connecting structures of the first switched capacitor circuit and the second switched capacitor circuit are the same as that of the original switched capacitor circuit, capacitance values of at least one capacitor of the first switched capacitor circuit and the second switched capacitor circuit are half as large as that of the original switched capacitor circuit, the first switches of the first switched capacitor circuit are controlled by the first control signal, the second switches of the first switched capacitor circuit are controlled by the second control signal, the first switches of the second switched capacitor circuit are controlled by the second control signal, and the second switches of the second switched capacitor circuit are controlled by the first control signal.

As illustrated in FIG. 6, the component connecting structures of the first switched capacitor circuit 5 and the second switched capacitor circuit 6 are the same, but the capacitance values of the capacitors C50, C60 are half as large as the capacitance value of the capacitor C90 in the switched capacitor circuit 9 as illustrated in FIG. 5. Similarly, the capacitance values of the capacitors C51, C61 are half as large as the capacitance value of the capacitor C91 in the switched capacitor circuit 9, and the capacitance values of the capacitors C52, C62 are half as large as the capacitance value of the capacitor C92 in the switched capacitor circuit 9. Besides, in the first switched capacitor circuit 5 and the second switched capacitor circuit 6, switches at corresponding positions are controlled by different control signals.

For example, the switch 501 corresponds to the switch 601, and they are controlled by the control signals $\phi 1$ and $\phi 2$ respectively. That is, according to the circuit layout diagram as illustrated in FIG. 3, the switch 501 and the switch 601 would not be in the closed state at the same time. Furthermore, the same relationship applies to the switches 502 and 602, the switches 503 and 603, the switches 504 and 604, the switches 505 and 605, the switches 506 and 606, the switches 507 and 607, the switches 508 and 608, the switches 509 and 609, the switches 510 and 610, the switches 511 and 611, the switches 512 and 612.

Subsequently, in the step S43, at least one third switch is electrically connected with at least one capacitor of the first switched capacitor circuit and at least one capacitor of the second switched capacitor circuit, and at least one third switch is controlled by a third control signal. Please refer to FIG. 3 and FIG. 6 simultaneously, wherein FIG. 3 depicts that the switch 701 is electrically connected between terminals, having the same polarity, of the capacitors 50, 60 illustrated in FIG. 6, the switch 702 is electrically connected between terminals, having the same polarity, of the capacitors 51, 61 illustrated in FIG. 6, and the switch 703 is electrically connected between terminals, having the same polarity, of the capacitors 52, 62 illustrated in FIG. 6. Besides, the switches 701, 702, 703 are controlled by the control signal $\phi 3$. According to the circuit layout diagram as illustrated in FIG. 3, the turn-on duration T1 of control signal $\phi 1$, the turn-on duration T2 of control signal $\phi 2$ and the turn-on duration T3 of control signal $\phi 3$ do not overlap with one another.

In the step S44, the input terminal of the first switched capacitor circuit 5 is electrically connected with that of the second switched capacitor circuit 6, so as to receive the input voltage VIN. In the step S45, the output terminal of the first switched capacitor circuit 5 is electrically connected with that of the second switched capacitor circuit 6, so as to output the output voltage VOUT.

What should be noticed is that the circuit layout diagrams as illustrated in FIGS. 3, 5 and 6 are merely for the purpose of exemplifying rather than limiting the present invention. The inventive spirit of the present invention is about modifying any type of existing switched capacitor circuits into the switched capacitor DC-DC convertor circuit capable of reducing switching power loss without affecting the original conversion ratio of the input voltage to the output voltage. For example, the conversion ratio of the input voltage to the output voltage of the switched capacitor DC-DC convertor circuit illustrated in FIG. 3 is 0.625, which is the same as that of the switched capacitor DC-DC convertor circuit illustrated in FIG. 5.

In addition, when the depicted and aforementioned components are configured at different positions, what may be understood is that relative positions of these components are changeable and the achievable functions thereof described above can be maintained at the same time. Furthermore, what may be inferred is that subsets of each combination, specific characteristics and the embodiment described above can be carried out independently but the subsets are still within the scope of the present invention. Consequently, numerous modifications, variations and enhancements can be made thereto by those skilled in the art without departing from the spirit and scope of the invention as set forth in the claims.

What is claimed is:

1. A switched capacitor DC-DC convertor circuit, for transforming an input voltage into an output voltage, and the switched capacitor DC-DC convertor circuit comprises:
   a first switched capacitor circuit, including a first input terminal, a first output terminal, a plurality of first switches, a plurality of second switches and at least one first capacitor, wherein the first switches and the second switches are connected with the at least one first capacitor respectively, the first switches are controlled by a first control signal, and the second switches are controlled by a second control signal;

a second switched capacitor circuit, including a second input terminal, a second output terminal, a plurality of third switches, a plurality of fourth switches and at least one second capacitor, wherein the third switches and the fourth switches are connected with the at least one second capacitor respectively, the third switches are controlled by the second control signal, and the fourth switches are controlled by the first control signal; and at least one fifth switch, electrically connected with the at least one first capacitor and the at least one second capacitor, wherein the at least one fifth switch is controlled by a third control signal;

wherein the first input terminal and the second input terminal are electrically connected with and receive the input voltage, the first output terminal and the second output terminal are electrically connected with and output the output voltage, the at least one first capacitor and the at least one second capacitor have a same capacitance value, the first switched capacitor circuit and the second switched capacitor circuit have a same component connecting structure, the first switches correspond to the third switches, and the second switches correspond to the fourth switches;

wherein turn-on durations of the first control signal, the second control signal and the third control signal do not overlap with one another.

2. The switched capacitor DC-DC convertor circuit of claim 1, wherein during the turn-on duration of the third control signal, the at least one fifth switch is turned on, the first switches and the fourth switches are turned off via the first control signal, and the second switches and the third switches are turned off via the second control signal.

3. The switched capacitor DC-DC convertor circuit of claim 1, wherein numbers of the at least one fifth switch, the at least one first capacitor and the at least one second capacitor are all plural, such that for each of the first capacitors and each of the second capacitors, one of the fifth switches is electrically connected between one of the first capacitors and a corresponding one of the second capacitors.

4. The switched capacitor DC-DC convertor circuit of claim 1, wherein the at least one fifth switch is electrically connected with terminals of the at least one first capacitor and the at least one second capacitor having a same polarity.

5. A method of producing a switched capacitor DC-DC convertor circuit, comprising:

providing an original switched capacitor circuit, including an input terminal, an output terminal, a plurality of first switches, a plurality of second switches and at least one capacitor, wherein the first switches and the second switches are connected with the at least one capacitor respectively, the plurality of first switches are controlled by a first control signal, and the plurality of second switches are controlled by a second control signal;

determining a first switched capacitor circuit and a second switched capacitor circuit according to the original switched capacitor circuit, wherein component connecting structures of the first switched capacitor circuit and the second switched capacitor circuit are the same as that of the original switched capacitor circuit, each of a capacitance value of at least one capacitor of the first switched capacitor circuit and a capacitance value of at least one capacitor of the second switched capacitor circuit is half as large as that of the original switched capacitor circuit, a plurality of first switches of the first switched capacitor circuit are controlled by the first control signal, a plurality of second switches of the first switched capacitor circuit are controlled by the second control signal, the plurality of first switches of the second switched capacitor circuit are controlled by the second control signal, and the plurality of second switches of the second switched capacitor circuit are controlled by the first control signal;

electrically connecting at least one third switch with at least one capacitor of the first switched capacitor circuit and at least one capacitor of the second switched capacitor circuit, the at least one third switch is controlled by a third control signal, and turn-on durations of the first control signal, the second control signal and the third control signal do not overlap with one another;

electrically connecting an input terminal of the first switched capacitor circuit with an input terminal of the second switched capacitor circuit; and electrically connecting the output terminal of the first switched capacitor circuit with that of the second switched capacitor circuit.

6. The method of producing the switched capacitor DC-DC convertor circuit of claim 5, wherein numbers of the at least one third switch, the at least one capacitor of the first switched capacitor circuit and the at least one capacitor of the second switched capacitor circuit are all plural, such that for each of the capacitors of the first switched capacitor circuit and each of the capacitors of the second switched capacitor circuit, one of the third switches is electrically connected between one of the capacitors of the first switched capacitor circuit and one of capacitors of the second switched capacitor circuit corresponding thereto.

7. The method of producing the switched capacitor DC-DC convertor circuit of claim 5, wherein the at least one third switch is electrically connected with terminals of the at least one capacitor of the first switched capacitor circuit and the at least one capacitor of the second switched capacitor circuit having a same polarity.

8. A switched capacitor DC-DC convertor circuit, for transforming an input voltage into an output voltage, and the switched capacitor DC-DC convertor circuit comprises:

a first switched capacitor circuit;

a second switched capacitor circuit having a component connecting structure the same as that of the first switched capacitor circuit, wherein a switch of the first switched capacitor circuit and a switch of the second switched capacitor circuit corresponding to each other are respectively controlled by control signals having non-overlapped turn-on durations, and a capacitor of the first switched capacitor circuit and a capacitor of the second switched capacitor circuit corresponding to each other are electrically connected at a duration which is not overlapped with the turn-on durations of the control signals;

wherein both of an input terminal of the first switched capacitor circuit and an input terminal of the second switched capacitor circuit receive the input voltage, and both of an output terminal of the first switched capacitor circuit and an output terminal of the second switched capacitor circuit output the output voltage.

* * * * *